US008033181B2

(12) United States Patent  (10) Patent No.: US 8,033,181 B2
Kibblewhite et al.  (45) Date of Patent: Oct. 11, 2011

(54) PROBE FOR FASTENER IDENTIFICATION AND ULTRASONIC LOAD MEASUREMENT

(75) Inventors: Ian E. Kibblewhite, Wayne, PA (US); Donald E. Kotas, Blue Bell, PA (US)

(73) Assignee: Innovation Plus, LLC, King of Prussia, PA (US)

( * ) Notice: Subject to any disclaimer, the term of this patent is extended or adjusted under 35 U.S.C. 154(b) by 154 days.

(21) Appl. No.: 12/227,772

(22) PCT Filed: May 24, 2007

(86) PCT No.: PCT/US2007/012302
§ 371 (c)(1), (2), (4) Date: Nov. 26, 2008

(87) PCT Pub. No.: WO2007/139834
PCT Pub. Date: Jun. 12, 2007

(65) Prior Publication Data
US 2009/0173161 A1 Jul. 9, 2009

Related U.S. Application Data

(60) Continuation-in-part of application No. 12/287,760, filed on Oct. 14, 2008, now Pat. No. 7,650,792, which is a division of application No. 11/344,029, filed on Jan. 31, 2006, now Pat. No. 7,441,462, which is a continuation-in-part of application No. 10/470,372, filed as application No. PCT/US02/03920 on Jan. 28, 2002, now Pat. No. 6,990,866, application No. 12/227,772, and a continuation-in-part of application No. 11/344,028, filed on Jan. 31, 2006, now Pat. No. 7,467,556, which is a continuation-in-part of application No. 10/528,515, filed as application No. PCT/US03/29302 on Sep. 19, 2003.

(60) Provisional application No. 60/808,908, filed on May 26, 2006, provisional application No. 60/412,125, filed on Sep. 19, 2002, provisional application No. 60/264,877, filed on Jan. 29, 2001.

(51) Int. Cl.
*F16B 31/02* (2006.01)
(52) U.S. Cl. .......................................................... 73/761
(58) Field of Classification Search ..................... 73/761
See application file for complete search history.

(56) References Cited

U.S. PATENT DOCUMENTS
1,909,476 A 5/1933 Trotter
(Continued)

FOREIGN PATENT DOCUMENTS
DE 33 27 964 2/1985
(Continued)

OTHER PUBLICATIONS

R. Adams, "Bar Code 1, 2-Dimensional Bar Code Page", Adams 1999 Communications, Apr. 12, 1999 (http://web.archive.org/web/20000229163608/http://www.adams1.com/pub/russadam/stack.html).

(Continued)

*Primary Examiner* — Lisa Caputo
*Assistant Examiner* — Octavia Davis
(74) *Attorney, Agent, or Firm* — Gary M. Cohen

(57) ABSTRACT

A system is provided for both reading an optical identification mark, such as a bar code, on a fastener and for making ultrasonic load measurements in the fastener using a single probe for use during fastener installation with assembly tools and for the inspection of load in preinstalled fasteners. The probe includes both a fiber optic imaging cable and at least one electrical conductor. The fiber optic imaging cable is optically coupled to an imaging device such as a bar code reader allowing the bar code reader to be located remote from the fastener. The electrical conductor provides an electrical connection from the ultrasonic transducer on the fastener to load measurement instrumentation. The probe is further capable of providing illumination of the bar code to facilitate reading of the bar code.

31 Claims, 14 Drawing Sheets

U.S. PATENT DOCUMENTS

| | | | |
|---|---|---|---|
| 2,413,797 A * | 1/1947 | Stone | 411/14 |
| 3,181,672 A | 5/1965 | Swanson | |
| 3,774,479 A | 11/1973 | Lesner | |
| 3,969,810 A | 7/1976 | Pagano | |
| 3,969,960 A | 7/1976 | Pagano | |
| 4,006,784 A | 2/1977 | Dudek | |
| 4,008,772 A | 2/1977 | Boys | |
| 4,043,222 A | 8/1977 | Dudek | |
| 4,074,772 A | 2/1978 | Jonsson | |
| 4,104,778 A | 8/1978 | Vliet | |
| 4,281,538 A | 8/1981 | Dudek | |
| 4,281,987 A | 8/1981 | Kleesattel | |
| 4,294,122 A | 10/1981 | Couchman | |
| 4,316,512 A | 2/1982 | Kibblewhite et al. | |
| 4,333,351 A | 6/1982 | Bickford | |
| 4,344,138 A | 8/1982 | Frasier | |
| 4,471,657 A | 9/1984 | Voris et al. | |
| 4,569,229 A | 2/1986 | de Halleux | |
| 4,602,511 A | 7/1986 | Holt | |
| 4,649,753 A * | 3/1987 | Goodsmith | 73/865.8 |
| 4,846,001 A | 7/1989 | Kibblewhite | |
| 4,899,591 A | 2/1990 | Kibblewhite | |
| 4,977,898 A | 12/1990 | Schwarzschild et al. | |
| 5,018,988 A | 5/1991 | Kibblewhite et al. | |
| 5,029,480 A | 7/1991 | Kibblewhite | |
| 5,042,015 A | 8/1991 | Stringer | |
| 5,092,175 A | 3/1992 | Winckler et al. | |
| 5,131,276 A | 7/1992 | Kibblewhite | |
| 5,150,714 A | 9/1992 | Green | |
| 5,165,831 A | 11/1992 | Yager et al. | |
| 5,170,277 A | 12/1992 | Bard et al. | |
| 5,211,061 A | 5/1993 | Goodwin | |
| 5,216,622 A | 6/1993 | Kibblewhite et al. | |
| 5,220,839 A | 6/1993 | Kibblewhite | |
| 5,242,253 A | 9/1993 | Fulmer | |
| 5,291,789 A * | 3/1994 | Walton | 73/761 |
| 5,303,585 A | 4/1994 | Lichte | |
| 5,343,785 A | 9/1994 | Holt et al. | |
| 5,366,026 A | 11/1994 | Maruyama et al. | |
| 5,437,525 A | 8/1995 | Bras | |
| 5,726,349 A | 3/1998 | Palmertree et al. | |
| 5,807,048 A | 9/1998 | d'Agraives et al. | |
| 5,970,798 A | 10/1999 | Gleman et al. | |
| 6,009,380 A | 12/1999 | Vecchio et al. | |
| 6,053,906 A | 4/2000 | Honda et al. | |
| 6,078,874 A | 6/2000 | Piety et al. | |
| 6,103,072 A | 8/2000 | Nishiwaki et al. | |
| 6,142,023 A | 11/2000 | Cole et al. | |
| 6,167,758 B1 | 1/2001 | Fomitchev | |
| 6,186,010 B1 | 2/2001 | Eguchi et al. | |
| 6,239,737 B1 | 5/2001 | Black | |
| 6,268,796 B1 | 7/2001 | Gnadinger et al. | |
| 6,338,716 B1 | 1/2002 | Hossack et al. | |
| 6,340,868 B1 | 1/2002 | Lys et al. | |
| 6,341,271 B1 | 1/2002 | Salvo et al. | |
| 6,350,245 B1 | 2/2002 | Cimino | |
| 6,502,463 B1 | 1/2003 | Clark et al. | |
| 6,598,900 B2 | 7/2003 | Stanley et al. | |
| 6,633,821 B2 | 10/2003 | Jackson et al. | |
| 6,671,185 B2 | 12/2003 | Duval | |
| 6,712,570 B2 | 3/2004 | Kersten | |
| 6,726,960 B1 | 4/2004 | Sanduja et al. | |
| 6,843,628 B1 | 1/2005 | Hoffmeister et al. | |
| 6,907,944 B2 | 6/2005 | Sale et al. | |
| 6,990,866 B2 | 1/2006 | Kibblewhite | |
| 7,441,462 B2 | 10/2008 | Kibblewhite | |
| 7,467,556 B2 | 12/2008 | Kibblewhite et al. | |
| 7,614,303 B2 | 11/2009 | McInerney et al. | |
| 2001/0014262 A1 | 8/2001 | Friederich et al. | |
| 2002/0044063 A1 | 4/2002 | Blagin et al. | |
| 2003/0095847 A1 | 5/2003 | Cheal | |
| 2004/0045729 A1 | 3/2004 | Lehnert et al. | |
| 2004/0050567 A1 | 3/2004 | Tambini | |
| 2004/0065154 A1 | 4/2004 | Kibblewhite | |
| 2006/0004290 A1 | 1/2006 | Smith et al. | |
| 2006/0123917 A1 | 6/2006 | Kibblewhite | |
| 2006/0157262 A1 | 7/2006 | Chen | |
| 2009/0038402 A1 | 2/2009 | Kibblewhite et al. | |
| 2009/0055028 A1 | 2/2009 | Kibblewhite et al. | |
| 2009/0188536 A1 | 7/2009 | Ho | |

FOREIGN PATENT DOCUMENTS

| | | |
|---|---|---|
| DE | 199 17 222 | 11/2000 |
| DE | 19917222 | 11/2000 |
| EP | 0441145 | 8/1991 |
| EP | 0 535 919 | 4/1993 |
| EP | 0 541 476 | 5/1993 |
| JP | 04-166732 A | 6/1992 |
| JP | 10-086074 | 4/1998 |
| JP | 02-002239939 A | 8/2002 |
| WO | WO 00/63565 | 10/2000 |
| WO | WO 02/061292 | 8/2002 |
| WO | WO 2004/027271 | 4/2004 |
| WO | WO 2007/089759 | 8/2007 |
| WO | WO 2007/089760 | 8/2007 |
| WO | WO 2007/117575 | 10/2007 |

OTHER PUBLICATIONS

"Insuring Your Products' Future Through Chemical Grafting" Polymer Research Corporation of America, Brooklyn, NY, (2000).

"Taptite 2000® Thread Rolling Fasteners" Catalog, REMINC Research Engineering & Manufacturing Inc., Middletown, Rhode Island (2001).

* cited by examiner

PROBE FOR FASTENER IDENTIFICATION AND ULTRASONIC LOAD MEASUREMENT

CROSS-REFERENCE TO RELATED APPLICATIONS

This application claims the benefit of U.S. Provisional Application No. 60/808,908, filed May 26, 2006.

This application is also a continuation-in-part of U.S. patent application Ser. No. 12/287,760, filed. Oct. 14, 2008, which has since issued as U.S. Pat. No. 7,650,792, on Jan. 26, 2010. U.S. patent application Ser. No. 12/287,760, is a divisional, of U.S. patent application Ser. No. 11/344,029, filed Jan. 31, 2006, which has since issued as U.S. Pat. No. 7,441,462, on Oct. 28, 2008. U.S. patent application Ser. No. 11/344,029 is a continuation-in-part of U.S. patent application Ser. No. 10/470,372, which has an assigned filing date of Jul. 25, 2003, which was the National Stage of International Application No. PCT/US02/03920, filed Jan. 28, 2002, which claims the benefit of U.S. Provisional Application No. 60/264,877, filed Jan. 29, 2001, and which has since issued as U.S. Pat. No. 6,990,866, on Jan. 31, 2006.

This application is also a continuation-in-part of U.S. patent application Ser. No. 11/344,028, filed Jan. 31, 2006, which has since issued as U.S. Pat. No. 7,467,556, on Dec. 23, 2008. U.S. patent application Ser. No. 11/344,028 is a continuation-in-part of U.S. patent application Ser. No. 10/528,515, which has an assigned filing date of Oct. 26, 2005, which was the National Stage of International Application No. PCT/US03/29302, filed Sep. 19, 2003, and which claims the benefit of U.S. Provisional Application No. 60/412,125, filed Sep. 19, 2002. U.S. patent application Ser. No. 10/528,515 is a continuation-in-part of U.S. patent application Ser. No. 10/470,372, which has an assigned filing date of Jul. 25, 2003, which was the National Stage of International Application No. PCT/US02/03920, filed Jan. 28, 2002, which claims the benefit of U.S. Provisional Application No. 60/264,877, filed Jan. 29, 2001, and which has since issued as U.S. Pat. No. 6,990,866, on Jan. 31, 2006.

BACKGROUND OF THE INVENTION

The present invention relates to the identification of fasteners with bar codes and the measurement of load in fasteners using ultrasonic load measurement methods.

Techniques have been developed for performing direct load measurements in fasteners utilizing ultrasonic transducers which are removably, or preferably permanently attached to the fasteners. Examples of such techniques can be found, for example, in U.S. Pat. No. 6,990,866 (Kibblewhite); U.S. Pat. No. 6,009,380 (Vecchio et al.); U.S. Pat. No. 5,220,839 (Kibblewhite); U.S. Pat. No. 5,018,988 (Kibblewhite et al.); U.S. Pat. No. 4,899,591 (Kibblewhite); and U.S. Pat. No. 4,846,001 (Kibblewhite), each of which is incorporated by reference as if fully set forth herein. It has been found that such techniques make it possible to directly control the installation load of various different types of fasteners using all types of assembly tools, including impact and impulse tools.

The above-referenced U.S. Pat. No. 6,990,866 discloses a load indicating member with a permanent identifying mark which can be read and used to determine ultrasonic measurement parameters specific to the load indicating member. This provides more precise and more reliable load measurements by compensating for differences resulting from manufacturing variations in individual load indicating members.

In one disclosed embodiment, a load indicating member has an ultrasonic transducer permanently mechanically, electrically and acoustically attached to one end of the load indicating member such that the load indicating member functions as a first electrode. The ultrasonic transducer comprises a piezoelectric element, adjacent to the end surface of the load indicating member, and an electrically conductive layer adjacent to the piezoelectric element functions as a second electrode. A high-density, two-dimensional, optically-read bar code is permanently marked on the surface of the electrode. In another disclosed embodiment, the bar code is used to store all of the ultrasonic parameters specific to that load indicating member which are required to make precise, reliable load measurements. In another disclosed embodiment, the bar code stores a unique identification of the load indicating member, which is used to retrieve from a database the ultrasonic parameters specific to that load indicating member which are required to make precise, reliable load measurements.

Also disclosed is a method of measuring the load in a load indicating member which includes the steps of reading the bar code with an optical reader, determining the ultrasonic measurement parameters, making pulse-echo time-of-flight ultrasonic wave measurements, and calculating the precise load.

In certain situations, however, it is not possible to read the bar code with a conventional bar code reader. One example of such a situation occurs after a fastener is installed, and other components of the assembly restrict the access of the bar code reader. Another example is during the installation of the fastener, when it is desirable to identify the bolt immediately prior to tightening with an assembly tool. In this situation, it is desirable to identify and tighten the fastener in a single operation to minimize fastener installation time and to eliminate operator errors. For example, such operator errors can occur in multiple bolt joints when one fastener is identified and then a different fastener is tightened.

SUMMARY OF THE INVENTION

A primary objective of the present invention is to provide a system for both reading an optical identification mark, such as a bar code, on a fastener and making ultrasonic load measurements in the fastener using a single probe for use during fastener installation with assembly tools and for inspection of load in preinstalled fasteners.

In accordance with the present invention, this objective is accomplished with a probe comprising both a fiber optic imaging cable and at least one electrical conductor. The fiber optic imaging cable is optically coupled to an imaging device such as a bar code reader allowing the bar code reader to be located remote from the fastener. The electrical conductor provides the electrical connection from the ultrasonic transducer on the fastener to the load measurement instrumentation. Preferably, the probe is of small diameter, flexible and is further capable of providing illumination of the bar code to facilitate reading of the bar code.

In a preferred embodiment of the present invention the end of the probe adjacent to the transducer includes a light emitting diode (LED) as a light source for illuminating the bar code. In an alternative preferred embodiment, the illumination source is remotely located and the light from the illumination source is directed to the bar code using the illumination fibers of a fiber optic cable.

The foregoing improvements are further described with reference to the detailed description which is provided hereafter, in conjunction with the following drawings.

BRIEF DESCRIPTION OF THE DRAWINGS

In the drawings, wherein like reference numerals refer to like elements throughout.

DESCRIPTION OF PREFERRED EMBODIMENTS

Figure 1:
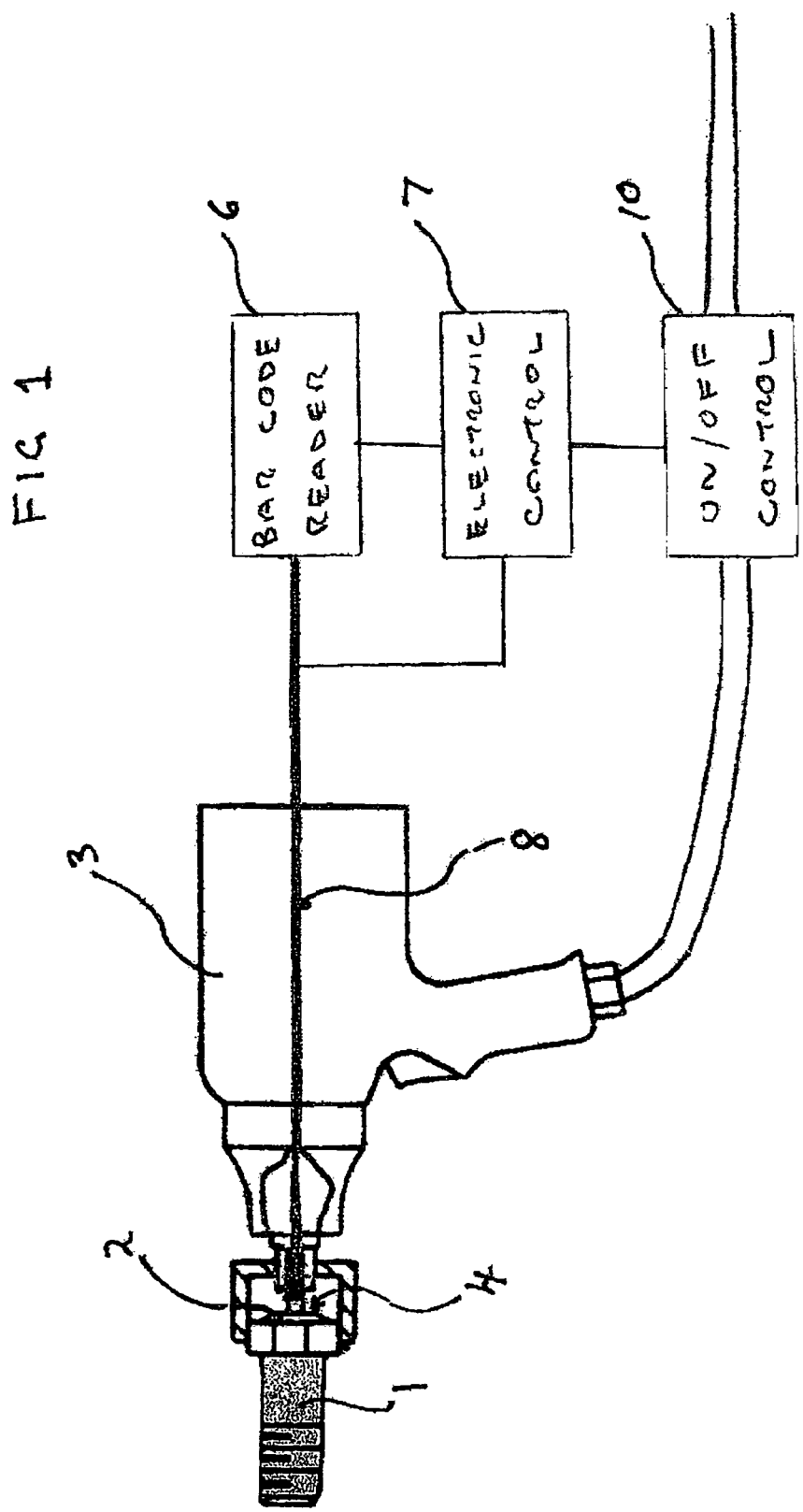
FIG. 1 is a partial cross-section of a hand held powered assembly tool such as an impact wrench having a probe of the present invention.

FIG. 1 shows a preferred embodiment of the present invention for fastener installation. An assembly tool 3 has been modified to incorporate a probe 8 of the present invention. Probe 8 operates to identify fastener 1 by optically coupling the image of a bar code on electrode surface 4 of ultrasonic transducer 2 attached to fastener 1 to bar code reader 6. Probe 8 further provides an electrical connection from electrode surface 4 of ultrasonic transducer 2 to electronic control 7 for making measurements of load in identified fastener 1. On/off control 10 is electrically connected to electronic control 7 and is used to turn off assembly tool 3 when the desired load has been achieved in identified fastener 1.

The fastener 1 of the preferred embodiment of the present invention is preferably a load indicating fastener with a permanent ultrasonic transducer 2, such as is described, for example, in the above-referenced U.S. Pat. Nos. 6,990,866; 5,220,839; 4,899,591; and 4,846,001. However, if desired, fastener 1 can also be a convention fastener with a removable ultrasonic transducer suitably applied to the fastener. Although the fastener 1 selected for illustration in the drawings is a threaded bolt, it is to be understood that any of a variety of different types of fasteners can be used in accordance with the present invention, other than the fastener 1 which has been shown for illustrative purposes.

Figure 2:
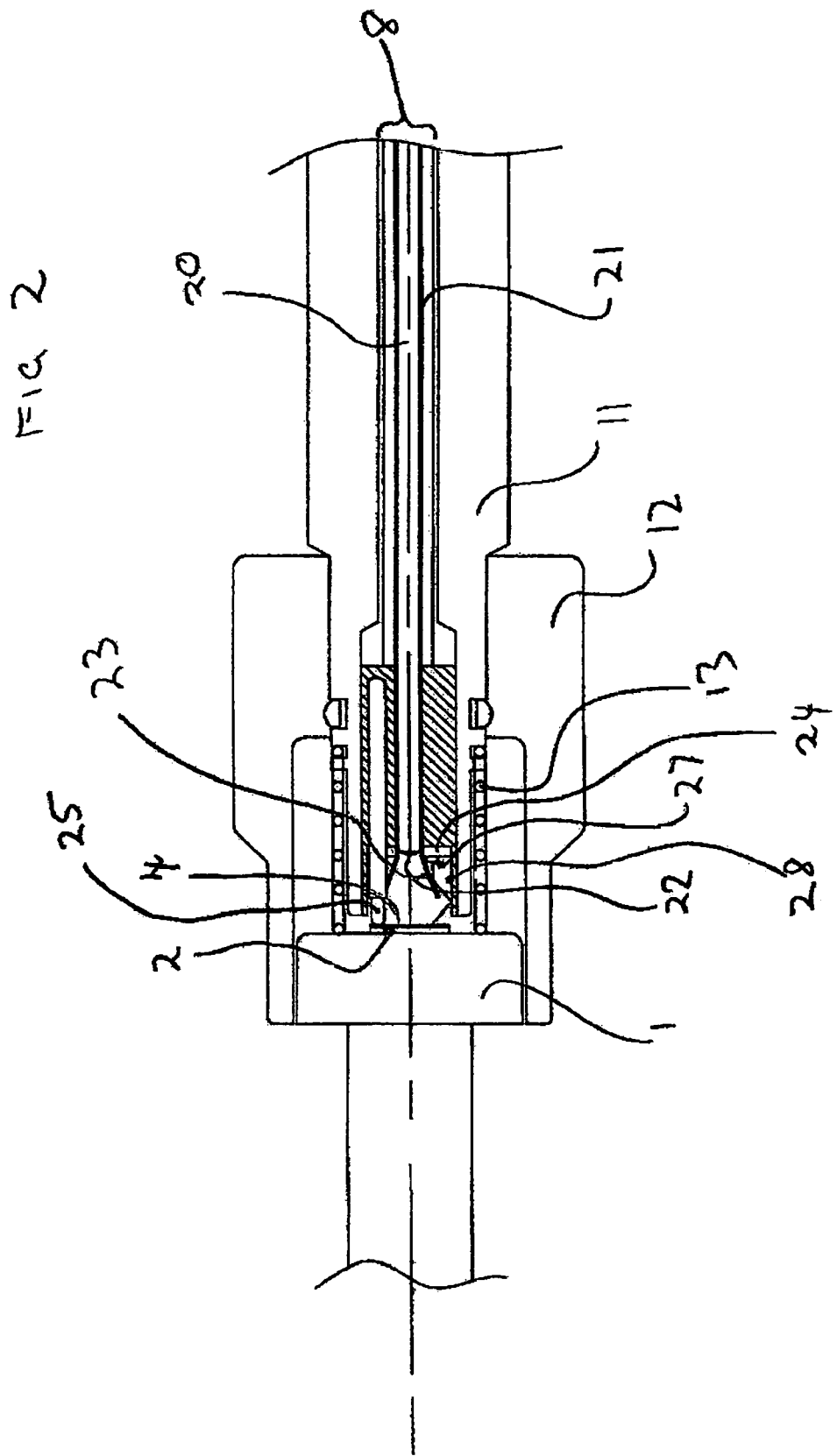
FIG. 2 is a detailed cross-section of the drive end of the probe of FIG. 1.

In the above-described preferred embodiment, probe 8, shown in greater detail in FIG. 2, includes a fiber optic imaging cable 20 and an electrical conductor 21. Fiber optic imaging cable 20 is of the type used in instruments such as bore scopes and endoscopes and has lens 22 attached to the end adjacent to transducer 2 in order to focus the image of the bar code on electrode surface 4. Fiber optic cables suitable for such remote imaging are typically less than 2 mm in diameter. In the preferred embodiment, electrical conductor 21 is a metallic tube in which fiber optic imaging cable 20 is coaxially located. Electrical connection to electrode surface 4 of transducer 2 is provided by one or more outwardly biased spring pins 25 mounted such that they do not interfere with the reading of the bar code. In the preferred embodiment, three pins on a diameter slightly larger than the maximum diameter of the bar code are used. The return electrical path in this embodiment is provided from a surface of fastener 1, acting as a transducer electrode, through the socket and tool drive. Electrical coupling from the fastener to the tool drive can alternatively or additionally be provided by placing a spring contact 13 between the tool drive 11 or socket 12 and fastener 1.

Figure 3:
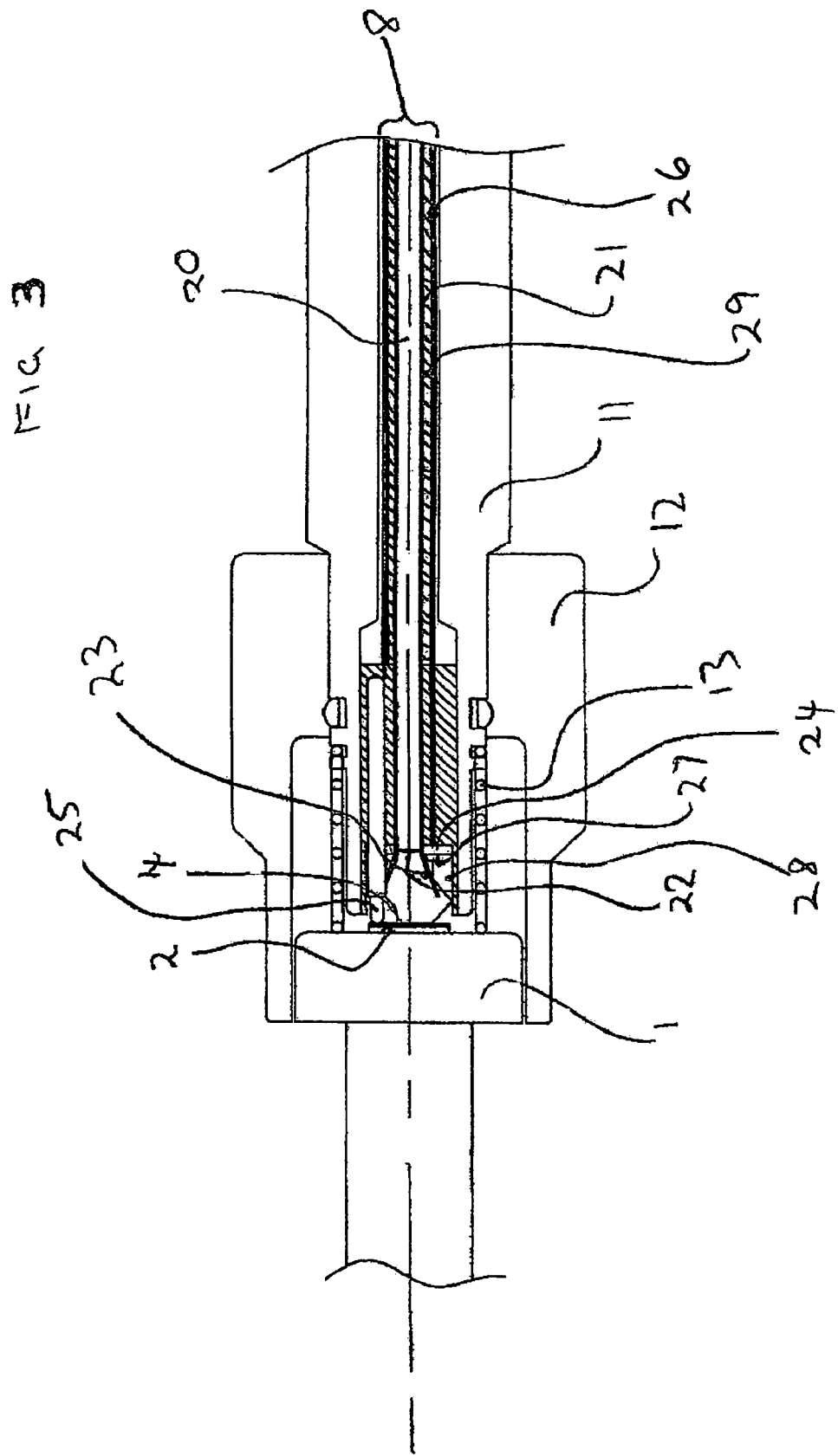
FIG. 3 is a detailed cross-section of the drive end of a probe with two electrical conductors.

The above-described return path can alternatively be provided by a second electrical conductor 26 in probe 8, as shown in FIG. 3. Preferably, second conductor 26 is coaxial with first electrical conductor 21 and has an electrical insulator isolating it from first conductor 21. The insulator is constructed of material and thickness appropriate to provide electrical impedance matching that of the connecting cable.

In order to provide a readable optical image of the bar code on electrode surface 4 for identification of fastener 1, it is necessary to further provide a source of illumination. In the above-described preferred embodiment, the illumination source is provided by an array of light emitting diodes (LED's) 27 mounted on circuit board 24 in such a way as to illuminate the bar code on electrode surface 4 of ultrasonic transducer 2, as shown in FIGS. 2 and 3. Preferably, the light is provided indirectly to eliminate direct reflections of the LED's from the reflective electrode surface 4, which could degrade the quality of the image. In the preferred embodiment shown in FIG. 2, the light from LED's 27 is first reflected by conical reflector 23 to outer cylindrical surface 28, where it is then reflected to electrode surface 4. Alternatively, the light from the illumination source could be directed to electrode surface 4 using a lens.

Figure 4:
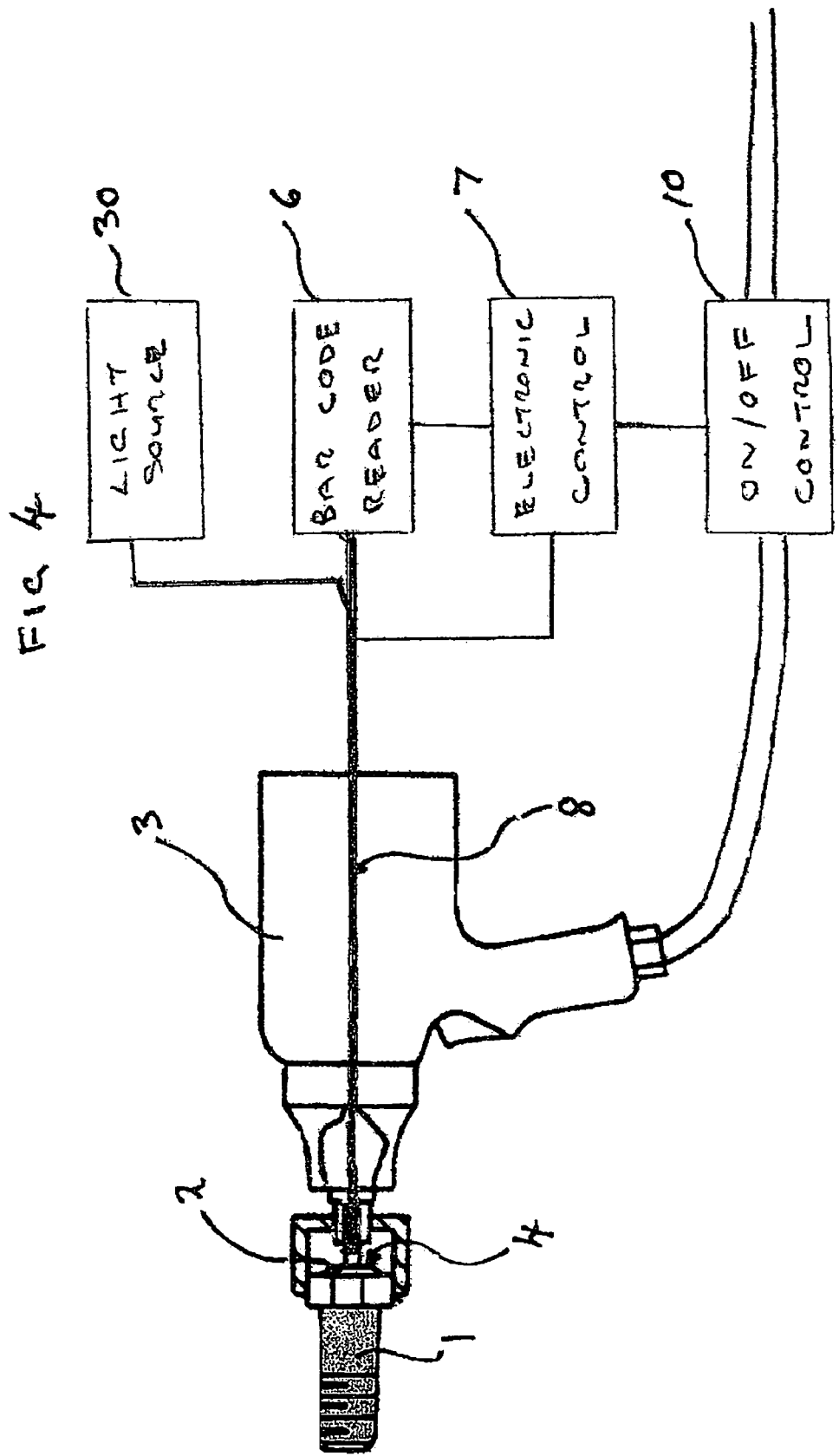
FIG. 4 is a partial cross-section of a hand held powered assembly tool such as an impact wrench having a probe of the present invention with illumination fibers and a remote light source.

In yet another embodiment, shown diagrammatically in FIG. 4, the illumination for the optical image is provided from a remote light source 30 though additional illumination fibers in fiber optic imaging cable 20. This method is known in the art and is commonly used with bore scopes and endoscopes. The light from the illumination fibers can be reflected or focused, as required, as with the above-described LED illumination.

A number of different electrical circuits can be used to drive the LED illumination of the above-described embodiments. Preferably, the LED electrical drive circuit provides adequate illumination, minimizes the number of electrical conductors and connections and can be implemented so as to avoid any adverse effect on the ultrasonic pulse-echo signals used for ultrasonic pulse-echo load measurements.

Figure 5:
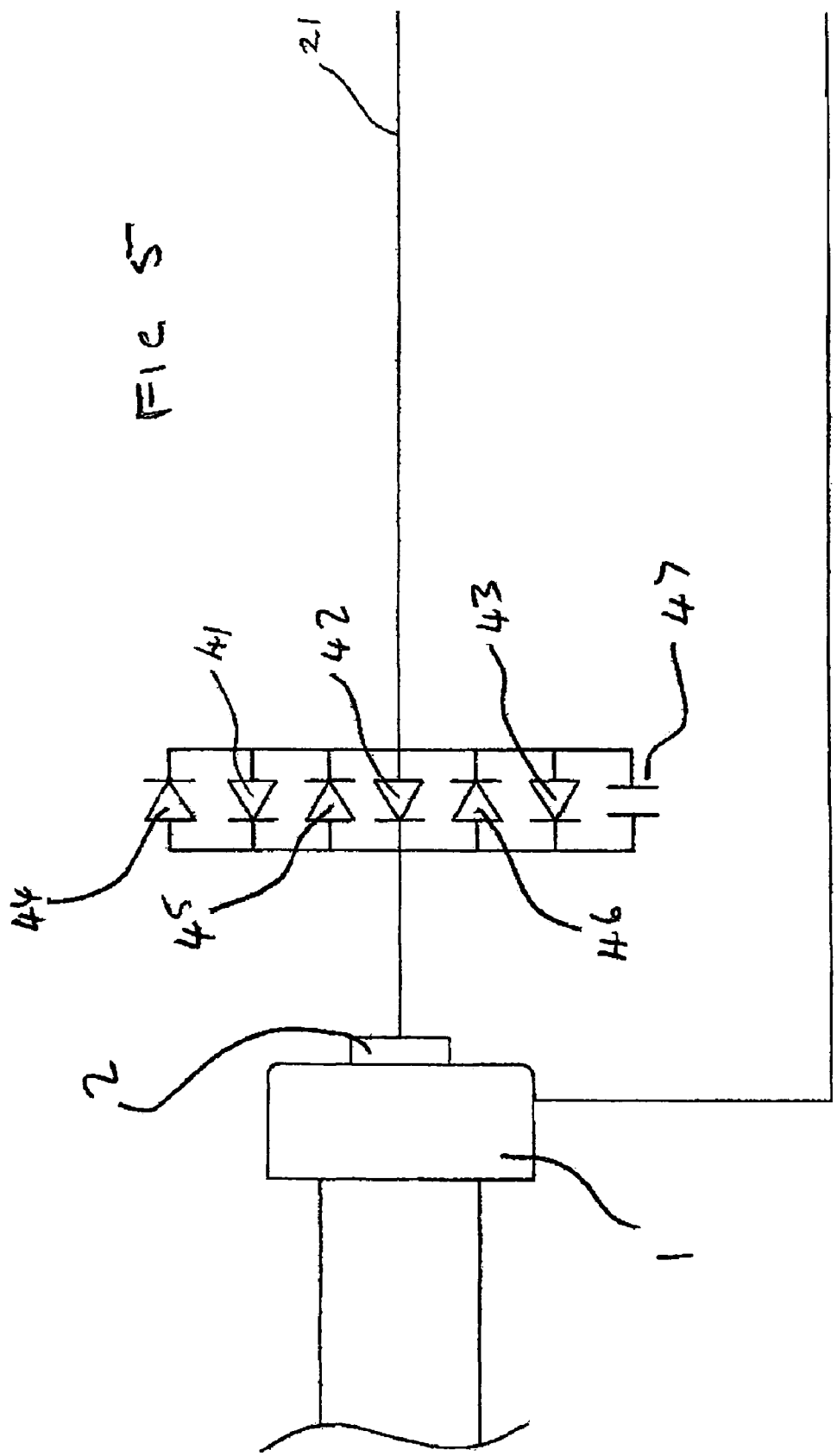
FIG. 5 is an electrical drive circuit with LED's in series with the transducer for use in a single conductor probe.

FIG. 5 shows a preferred electrical circuit used with the single electrical conductor embodiment described above and shown in FIGS. 1 and 2. Forward connected LED's 41, 42, 43 and reverse connected LED's 44, 45, 46, all connected in parallel, are in turn connected in series with electrical conductor 21, used for the pulse-echo electrical drive, and transducer 2. AC excitation, similar to that used for transducer excitation, alternately drives the forward and reverse connected LED's providing the illumination source. Capacitor 47 assists in coupling of the ultrasonic pulse-echo signals, minimizing the effect of the LED's on the pulse-echo load measurement.

Figure 6:
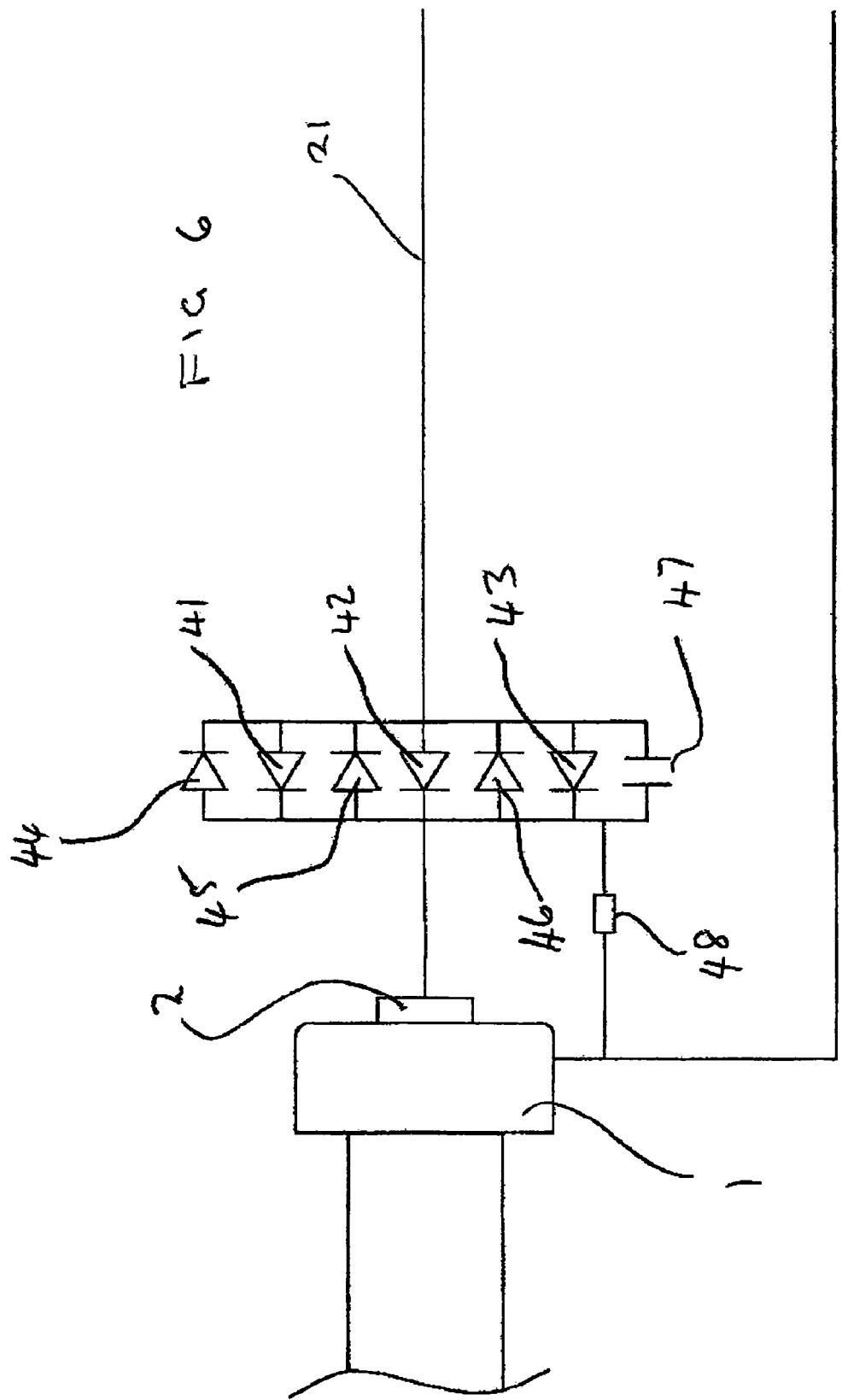
FIG. 6 is an electrical drive circuit with LED's in series with the transducer for use in a single conductor probe with an electrical connection to the tool drive.
Figure 7:
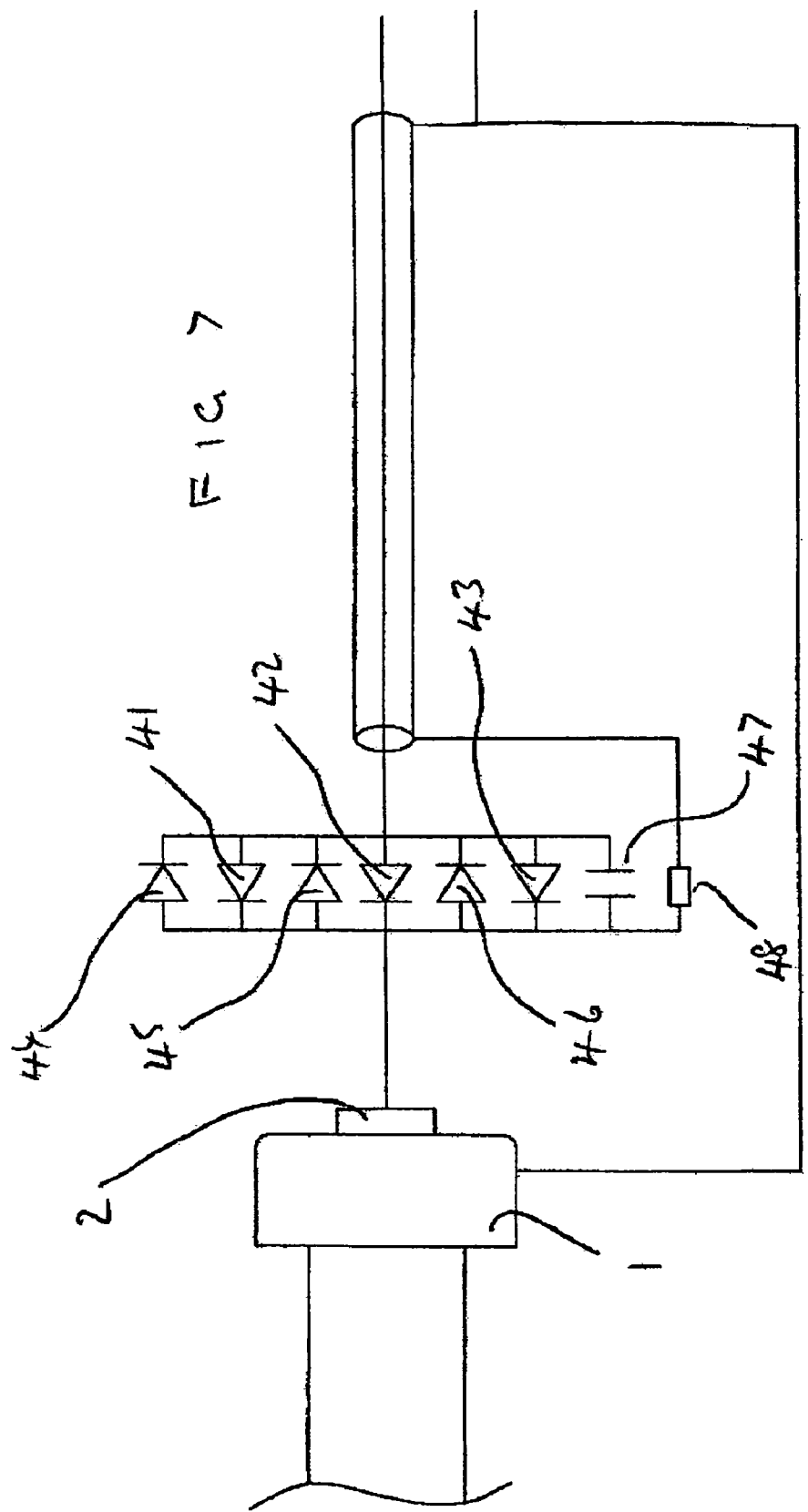
FIG. 7 is an electrical drive circuit with LED's in series with the transducer for use in a two conductor probe.

An alternative drive circuit, shown in FIG. 6, includes a conductor cable matching resistor 48 at the end of probe 8 adjacent to ultrasonic transducer 2. The circuit provides a more efficient drive for the LED's and is more desirable for high frequency ultrasonic load measurements since it provides improved cable termination. It does, however, require an additional ground connection from probe 8 to tool drive shaft 11 or fastener 1, shown in FIG. 2. An alternative circuit, shown in FIG. 7, uses the above-described two-conductor probe, shown in FIG. 3, but eliminates the additional connection from probe 8 to tool drive shaft 11 or fastener 1.

Figure 8:
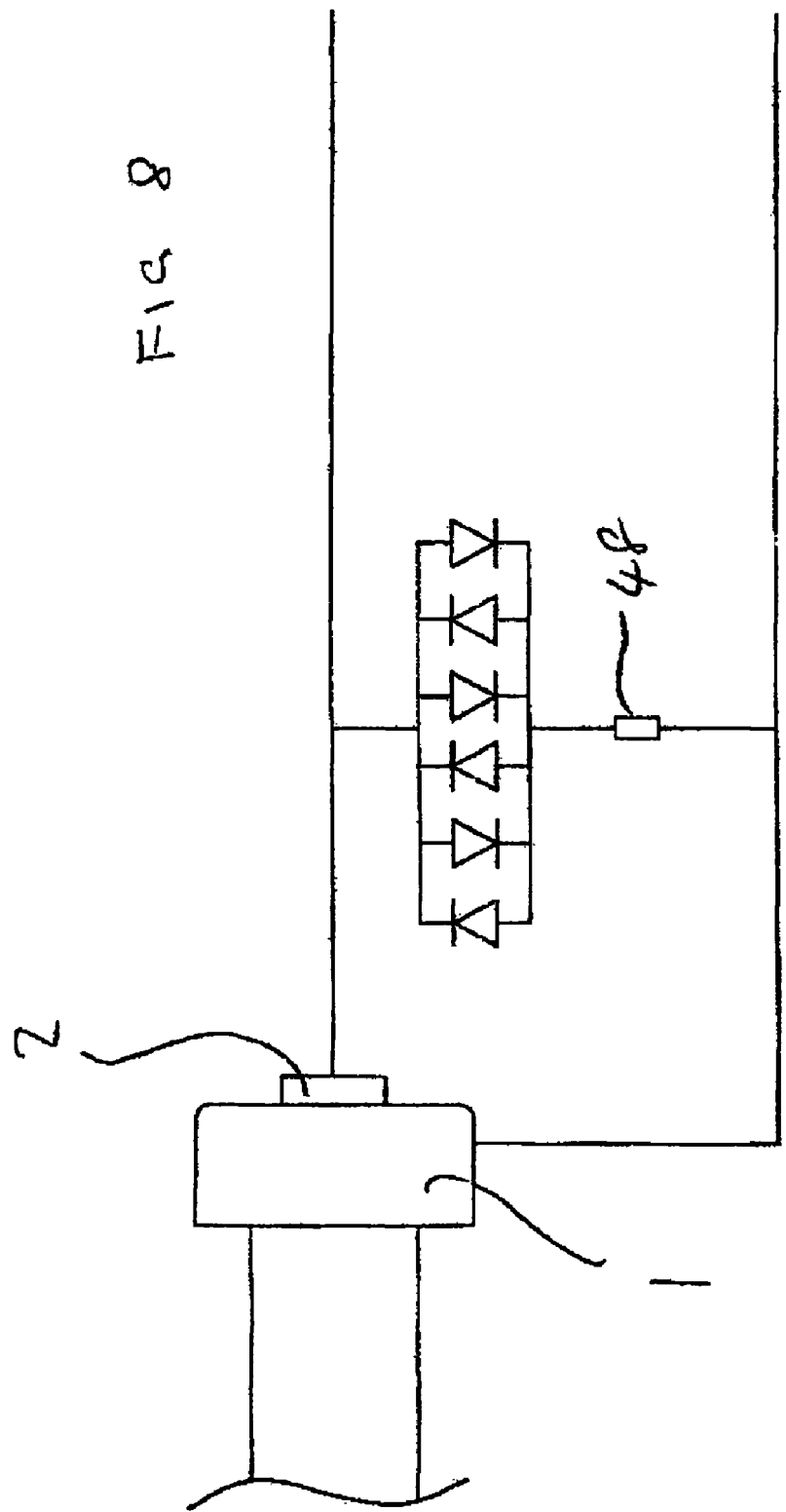
FIG. 8 is an electrical drive circuit with LED's in parallel with the transducer for use in a single conductor probe with an electrical connection to the tool drive.
Figure 9:
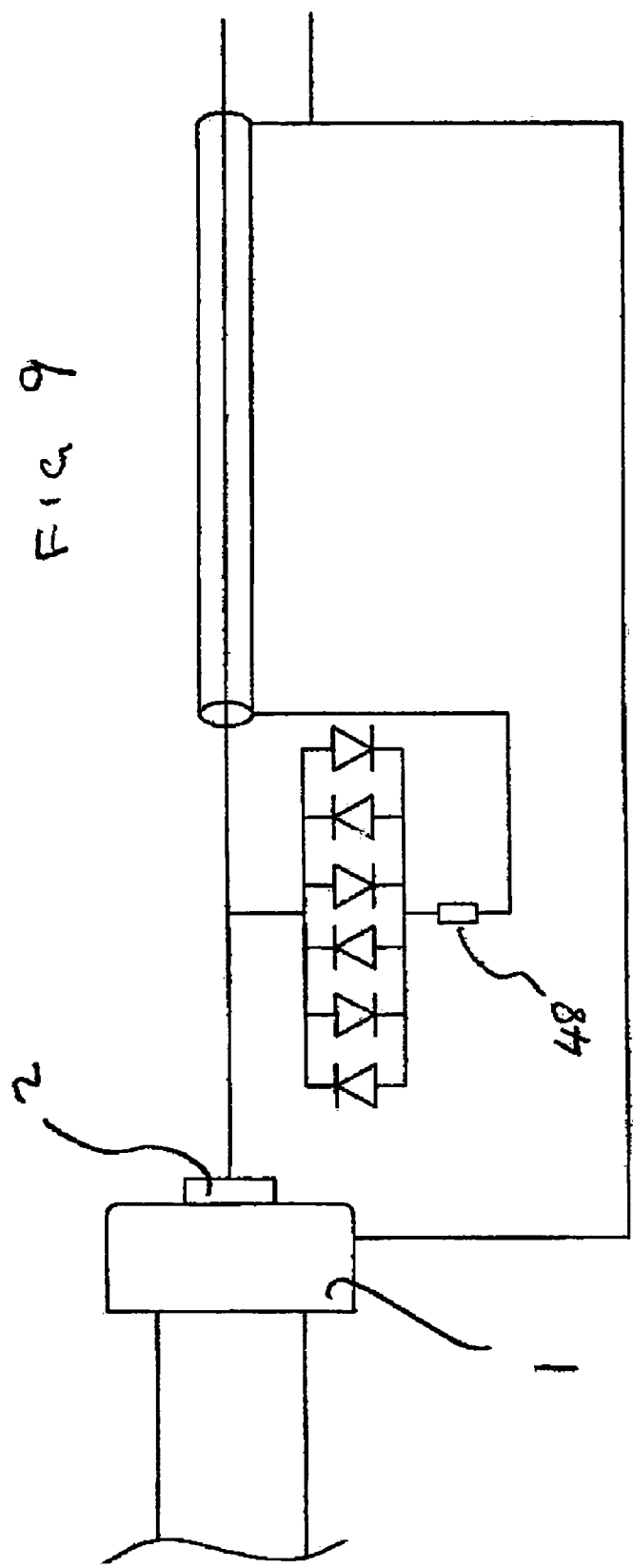
FIG. 9 is an electrical drive circuit with LED's in parallel with the transducer for use in a two conductor probe.

Further examples of electrical drive circuits which provide both drive for the illumination source and transducer excitation are shown in FIGS. 8 and 9. Both circuits are similar to those described above except that the LED's are connected in parallel with the transducer instead of in series.

Figure 10:
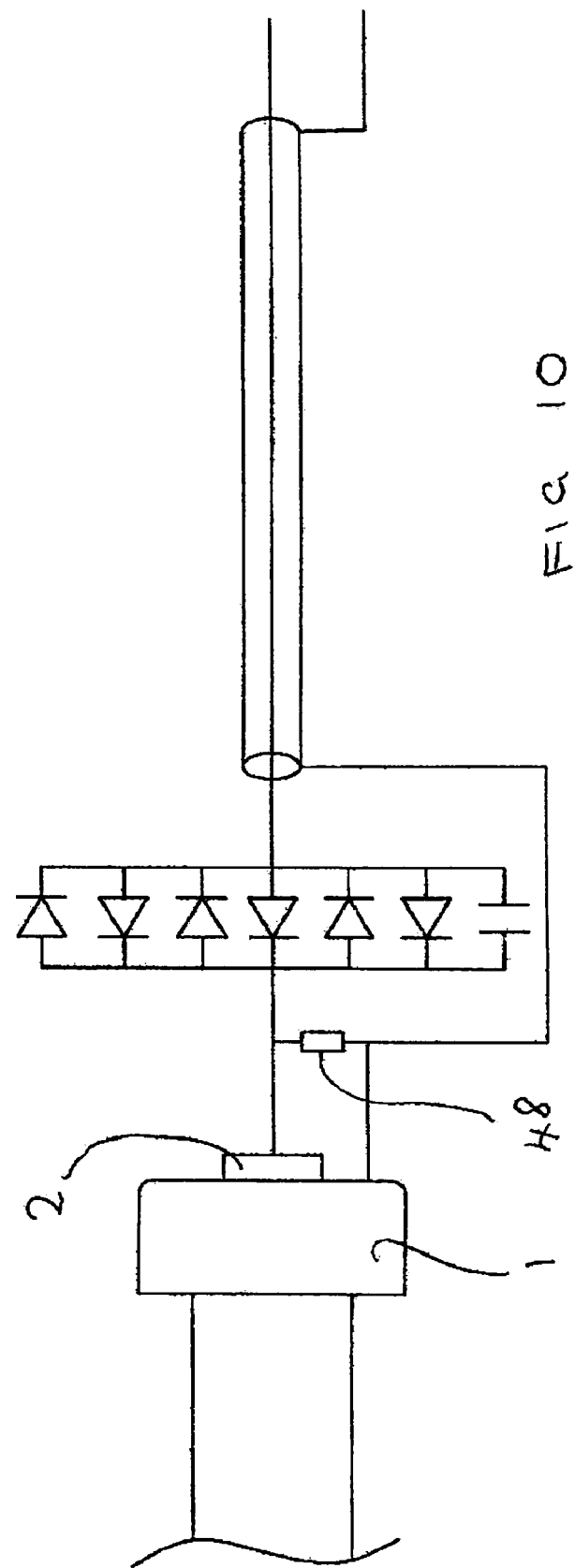
FIG. 10 is an electrical drive circuit with LED's in series with the transducer for use in a two conductor probe without an electrically conducting tool return path.
Figure 11:
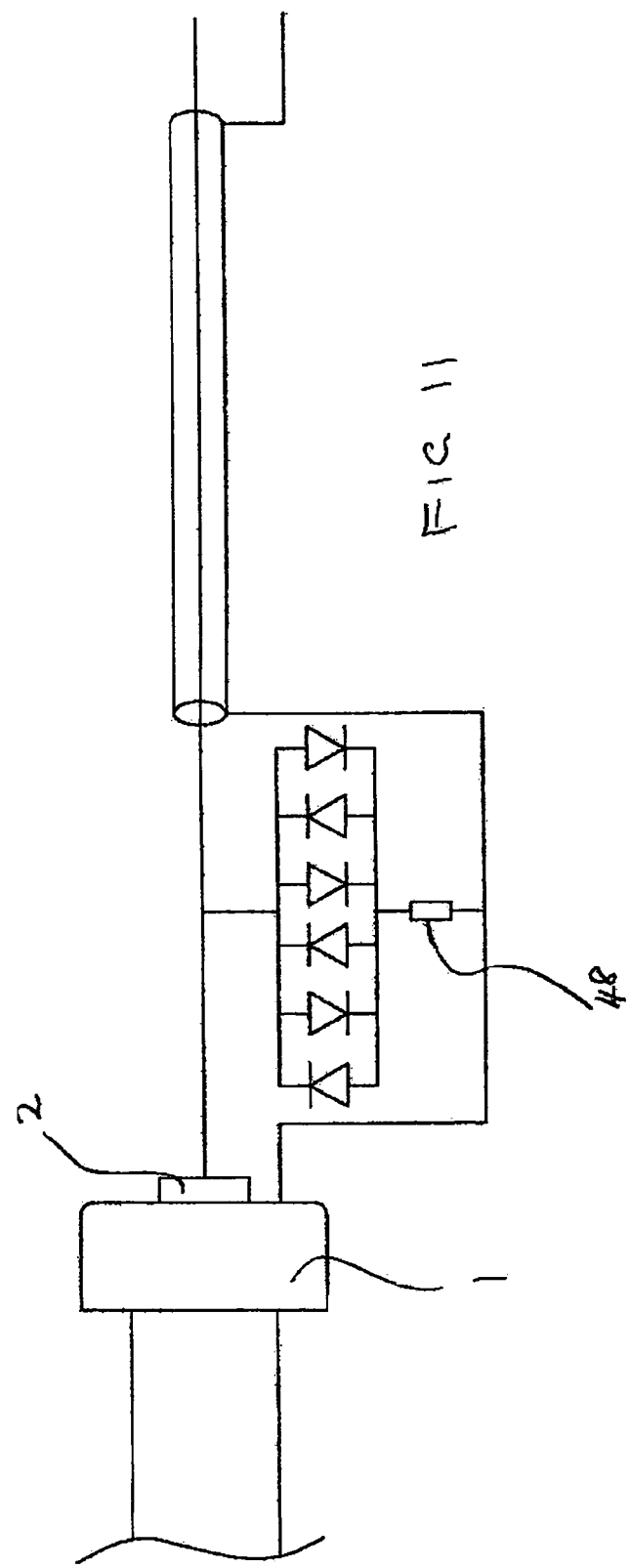
FIG. 11 is an electrical drive circuit with LED's in parallel with the transducer for use in a two conductor probe without an electrically conducting tool return path.

FIGS. 10 and 11 show additional examples of electrical drive circuits which use the two-conductor probe of the embodiment shown in FIG. 3 as the return for both the LED's and the transducer, eliminating the requirement for an electrically conductive path through the tool.

In the above-described embodiments, 6 LED's are shown by way of example. It will be appreciated by one skilled in the art that any number of LED's can be used providing they can be mounted on the end of probe 8. Also, the LED's can be alternatively configured for DC operation. It will be further appreciated by one skilled in the art that a light source other than LED's can also be used, if desired.

In the above-described embodiments, probe 8 is fixed so as not to rotate relative to tool 3 and the transducer contact pins 25 rotationally slide on electrode surface 4 of transducer 2. Alternatively, probe 8 can be rotationally fixed in the drive shaft so as not to rotate relative to fastener 1 and transducer 2. A rotating optical and electrical connection can then be provided at the other end of probe 8, which is in turn connected to bar code reader 6 and electronic control 7.

Also, in the above-described examples of the present invention, the electrical conductors 21, 26 of probe 8 are described as metallic tubes. Alternatively, these conductors can be flexible coaxial conductors, such as small diameter long extension springs, or conventional wires wrapped around or running adjacent to the fiber optic imaging cable to produce a flexible probe for use in tools used with universal joints, for example.

Figure 12:
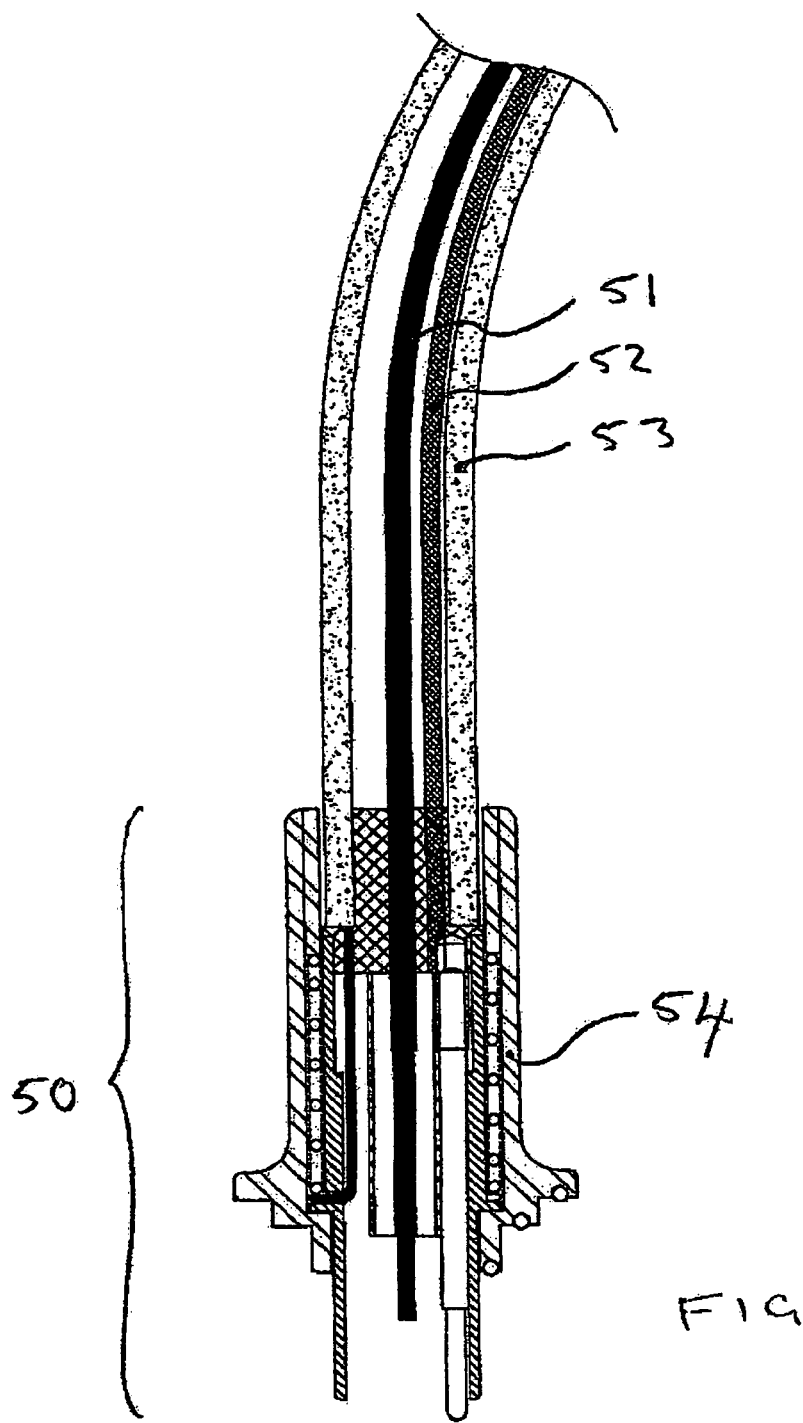
FIG. 12 is a cross-section of an inspection probe incorporating the probe of the present invention.

Yet another embodiment of the present invention, using a flexible probe as an inspection probe, is shown in FIG. 12. Inspection probe 50 has fiber optic imaging cable 51 and two flexible conductors 52, 53. During inspection, spring biased sheath 54 is held against the fastener, providing the return contact from the bolt, enabling probe 50 to function in the same way as the above-described probe 8 of FIG. 2. Inspection probe 50 enables fastener identification and inspection load measurements to be made on preinstalled fasteners with restricted access.

Figure 13:
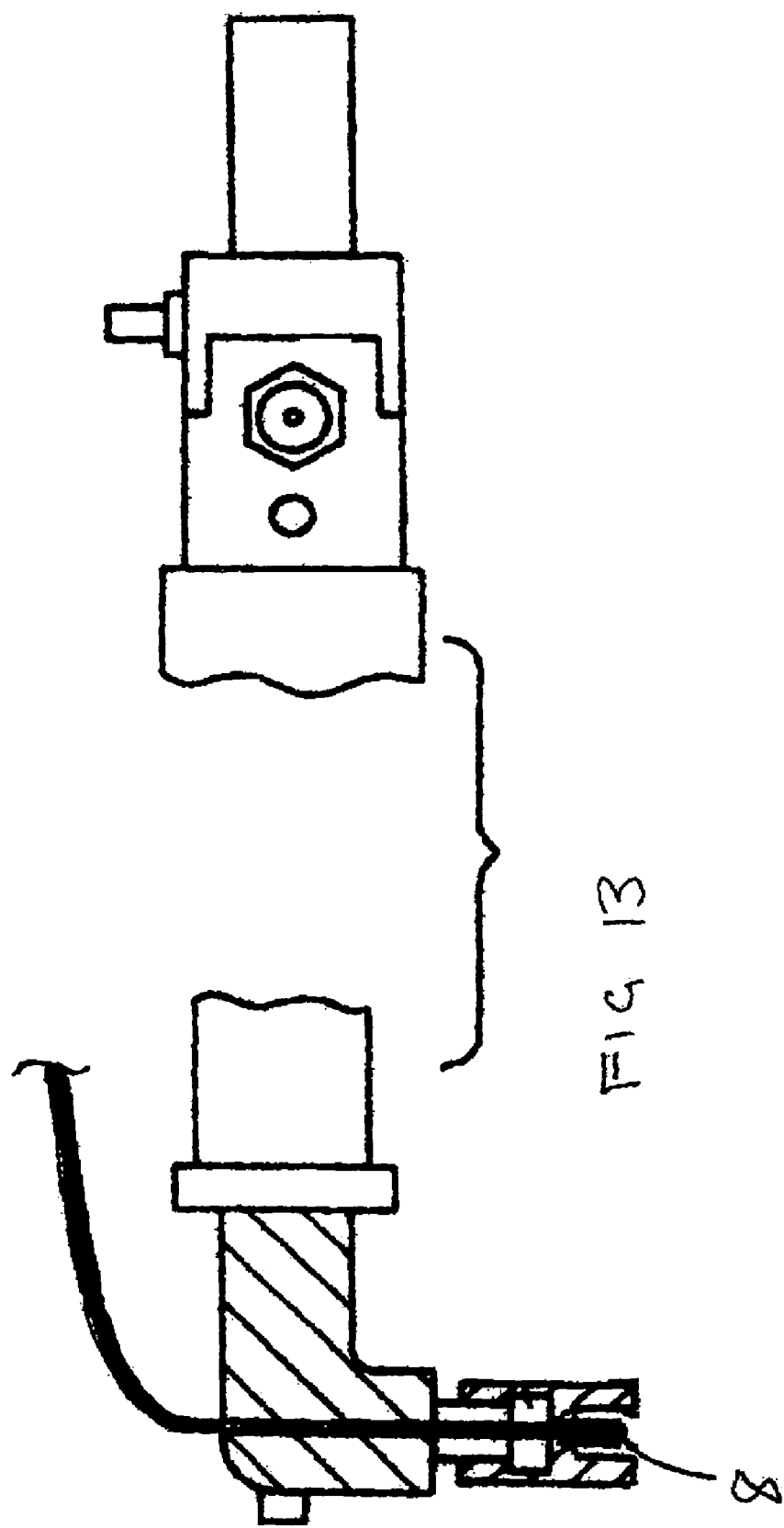
FIG. 13 is a partial cross-section of an assembly tool with a right angle gear head incorporating the probe of the present invention.
Figure 14:
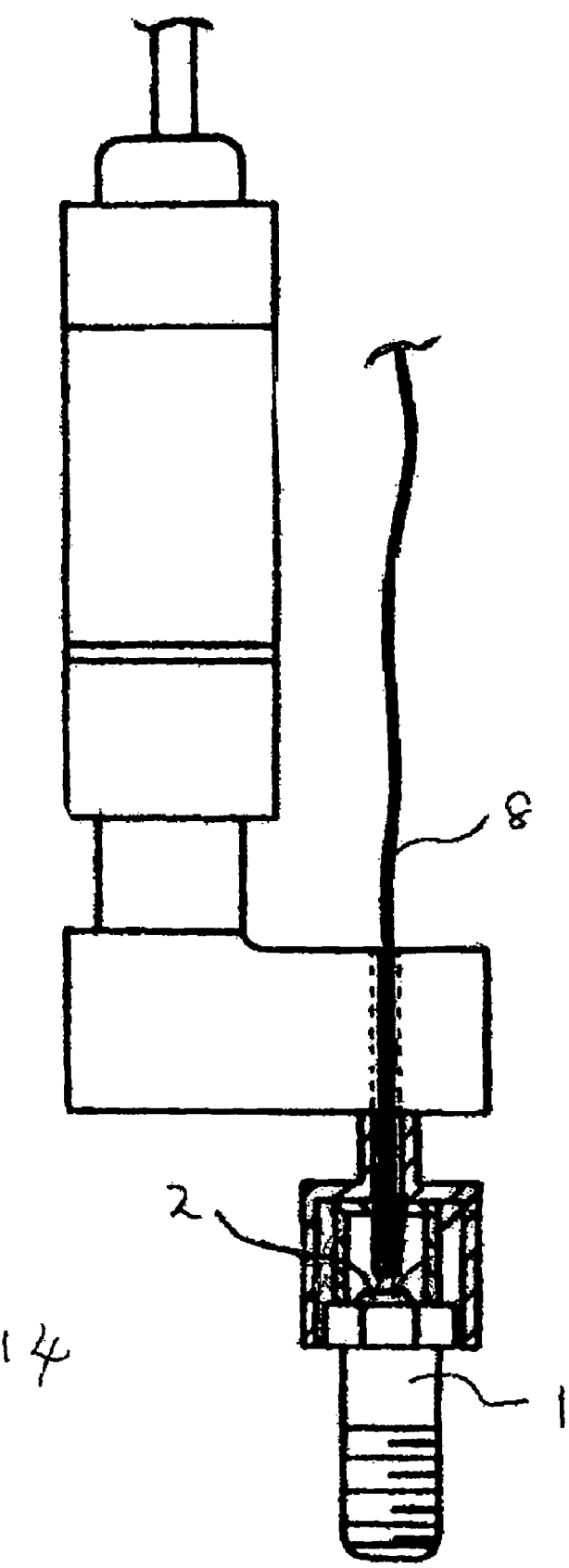
FIG. 14 is a partial cross-section of an assembly tool with an offset gearbox incorporating the probe of the present invention.

It will be appreciated by one skilled in the art that the above-described systems for both reading an optical identification mark, such as a bar code, on a fastener and making ultrasonic load measurements in the fastener using a single probe during fastener installation is applicable to all types of tools including air and electric tools, automated and portable tools, impact wrenches, impulse tools and continuous tightening tools, and non-tightening fastener load inspection equipment. Examples of probes of the present invention used with such tools are shown in FIGS. 13 and 14. FIG. 13 shows a probe of the present invention incorporated in a tool with a right angle gear head. FIG. 14 shows a probe of the present invention incorporated in a tool with an offset gearbox.

Accordingly, it is to be understood that various changes in the details, materials, components and arrangement of parts which have been herein described and illustrated in order to explain the nature of this invention may be made by those skilled in the art within the principle and scope of the invention as expressed in the following claims.

What is claimed is:

1. An apparatus for use with a fastener having an ultrasonic transducer coupled with the fastener and an optical identification mark coupled with the ultrasonic transducer, for reading the optical identification mark on the fastener and for making ultrasonic load measurements in the fastener using the ultrasonic transducer, the apparatus comprising:
   a probe including an image coupling device, wherein the image coupling device is coupled to an imaging device for reading the optical identification mark, at least one electrical conductor associated with the image coupling device, wherein the electrical conductor provides an electrical connection between the ultrasonic transducer and equipment for measuring load in the fastener, and a light source for illuminating the optical identification mark, wherein the light source is coupled with the probe for indirect illumination of the optical identification mark.

2. The apparatus of claim 1 wherein the fastener is a threaded fastener.

3. The apparatus of claim 2 wherein the ultrasonic transducer is permanently coupled with the fastener.

4. The apparatus of claim 2 wherein the ultrasonic transducer is removably coupled with the fastener.

5. The apparatus of claim 1 wherein the electrical connection between the ultrasonic transducer and the equipment for measuring load in the fastener is a spring biased pin.

6. The apparatus of claim 1 which further includes a second electrical conductor associated with the image coupling device.

7. The apparatus of claim 1 wherein the probe further includes a spring biased sheath for engaging the fastener to establish a second electrical connection with the fastener.

8. The apparatus of claim 1 wherein the optical identification mark is a bar code.

9. The apparatus of claim 8 wherein the imaging device for reading the optical identification mark is a bar code reader.

10. The apparatus of claim 1 wherein the light source further includes a reflector coupled with the light source, and an outer reflective surface coupled with the reflector for directing light onto the optical identification mark.

11. The apparatus of claim 1 wherein the light source further includes an outer reflective surface coupled with the light source for directing light onto the optical identification mark.

12. The apparatus of claim 1 wherein the light source further includes a lens coupled with the probe for illuminating the optical identification mark.

13. The apparatus of claim 1 wherein the light source is located remotely from the probe.

14. The apparatus of claim 13 wherein the probe includes illuminating fibers associated with the image coupling device for directing light from the light source to the optical identification mark.

15. The apparatus of claim 1 wherein the light source is at least one light emitting diode coupled with an end of the probe adjacent to the ultrasonic transducer.

16. The apparatus of claim 1 wherein the probe is coupled with the imaging device and the equipment for measuring load in the fastener, for inspecting a load in a preinstalled fastener.

17. The apparatus of claim 1 wherein the probe is coupled with an assembly tool for installing the fastener.

18. The apparatus of claim 17 wherein the probe is fixed to the assembly tool so as not to rotate relative to the assembly tool, and which includes contact pins for rotationally sliding on surface portions of the ultrasonic transducer.

19. The apparatus of claim 17 wherein the assembly tool has a drive shaft, and wherein the probe is rotationally fixed on the drive shaft so as not to rotate relative to the fastener, and wherein the probe includes a rotating connection for communicating with the optical identification mark and the ultrasonic transducer.

20. A method for reading an optical identification mark on a fastener having an ultrasonic transducer coupled with the fastener, and for making ultrasonic load measurements in the fastener, wherein the optical identification mark is coupled with the ultrasonic transducer, and wherein the method comprises the steps of:
    applying a probe to the fastener, wherein the probe includes an image coupling device and at least one electrical conductor associated with the image coupling device;
    optically coupling the optical identification mark on the fastener with an imaging device for reading the optical identification mark, using the image coupling device, while indirectly illuminating the optical identification mark with a light source coupled with the probe; and
    electrically connecting the ultrasonic transducer with equipment for measuring load in the fastener, using the electrical conductor.

21. The method of claim 20 wherein the fastener is a threaded fastener.

22. The method of claim 21 which further includes the step of permanently coupling the ultrasonic transducer with the fastener.

23. The method of claim 21 which further includes the step of removably coupling the ultrasonic transducer with the fastener.

24. The method of claim 20 which further includes the step of simultaneously optically coupling the image coupling device with the optical identification mark, and electrically connecting the electrical conductor with the ultrasonic transducer.

25. The method of claim 20 wherein the optical identification mark is a bar code, and which further includes the step of reading the bar code with a bar code reader coupled with the image coupling device.

26. The method of claim 20 which further includes the step of coupling a light emitting diode with an end of the probe adjacent to the ultrasonic transducer, for illuminating the optical identification mark.

27. The method of claim 20 which further includes the step of illuminating the optical identification mark with a light source located remotely from the probe.

28. The method of claim 20 which further includes the step of inspecting a load in a preinstalled fastener, using the probe, by coupling the probe with the fastener and by communicating with the imaging device and the equipment for measuring load in the fastener.

29. The method of claim 20 which further includes the step of installing the fastener, using an assembly tool, while coupling the probe with the fastener and by communicating with the imaging device and the equipment for measuring load in the fastener.

30. The method of claim 29 which further includes the step of fixing the probe to the assembly tool so as not to rotate relative to the assembly tool, and rotationally sliding contact pins associated with the probe on surface portions of the ultrasonic transducer.

31. The method of claim 29 wherein the assembly tool has a drive shaft, and wherein the method further includes the step of rotationally fixing the probe on the drive shaft so as not to rotate relative to the fastener, and communicating with the optical identification mark and the ultrasonic transducer using a rotating connection associated with the probe.

* * * * *